Figure 1:
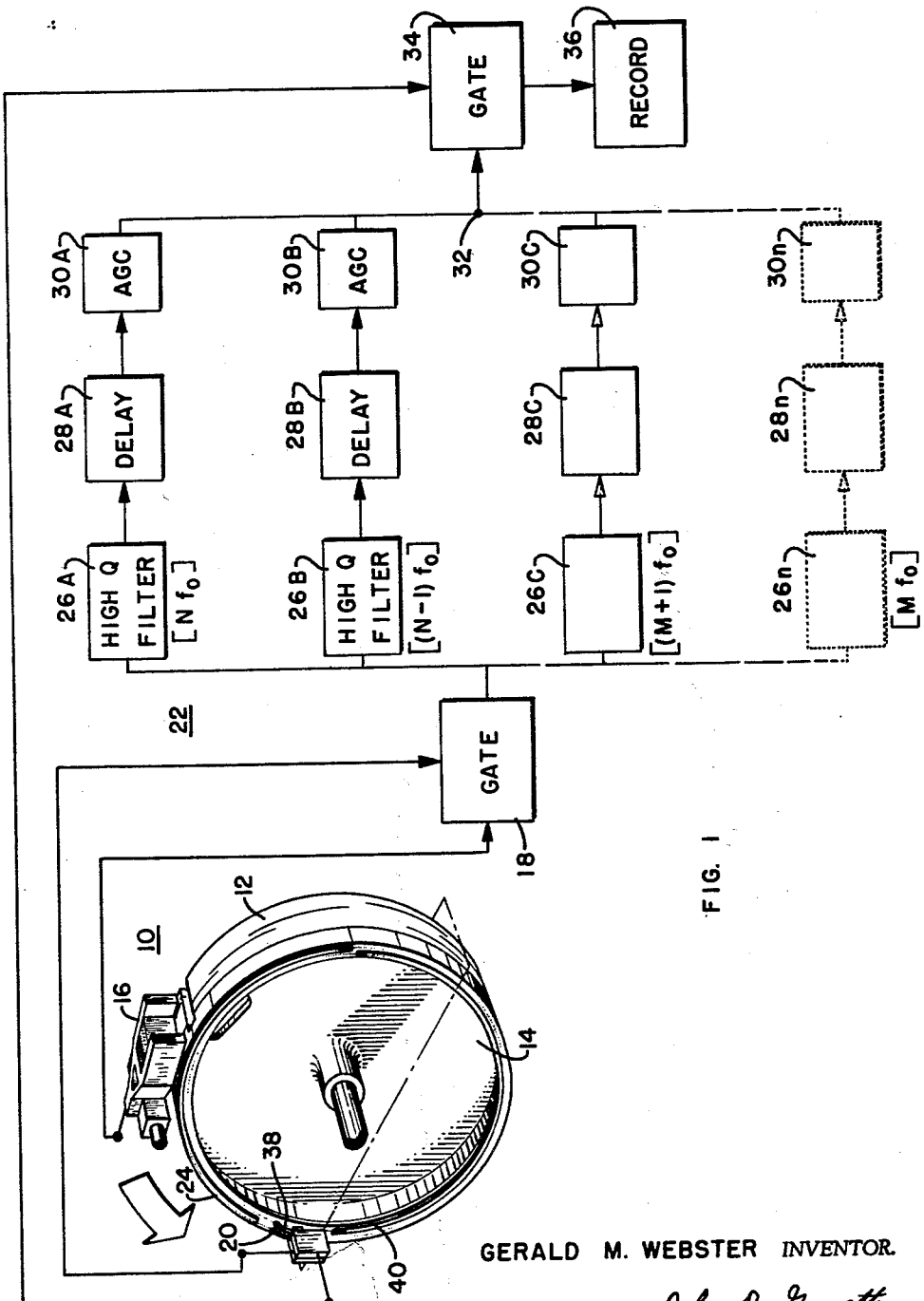

March 30, 1965 — G. M. WEBSTER — 3,176,305
SEISMIC SIGNAL PROCESSING SYSTEM
Filed Feb. 1, 1962 — 2 Sheets-Sheet 1

GERALD M. WEBSTER INVENTOR.

BY *John D. Gossett*

ATTORNEY

March 30, 1965 G. M. WEBSTER 3,176,305
SEISMIC SIGNAL PROCESSING SYSTEM
Filed Feb. 1, 1962 2 Sheets-Sheet 2
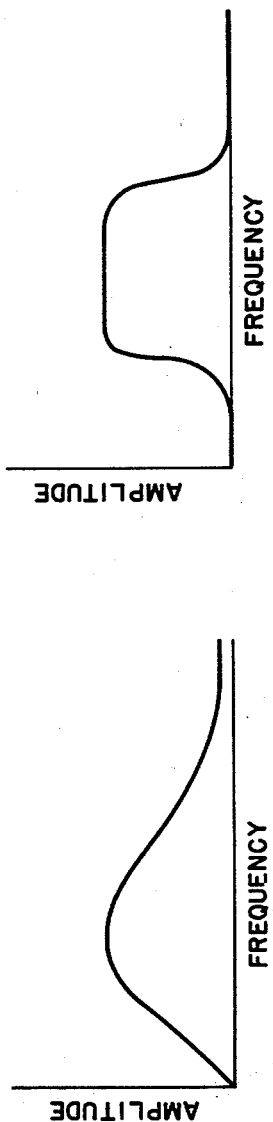
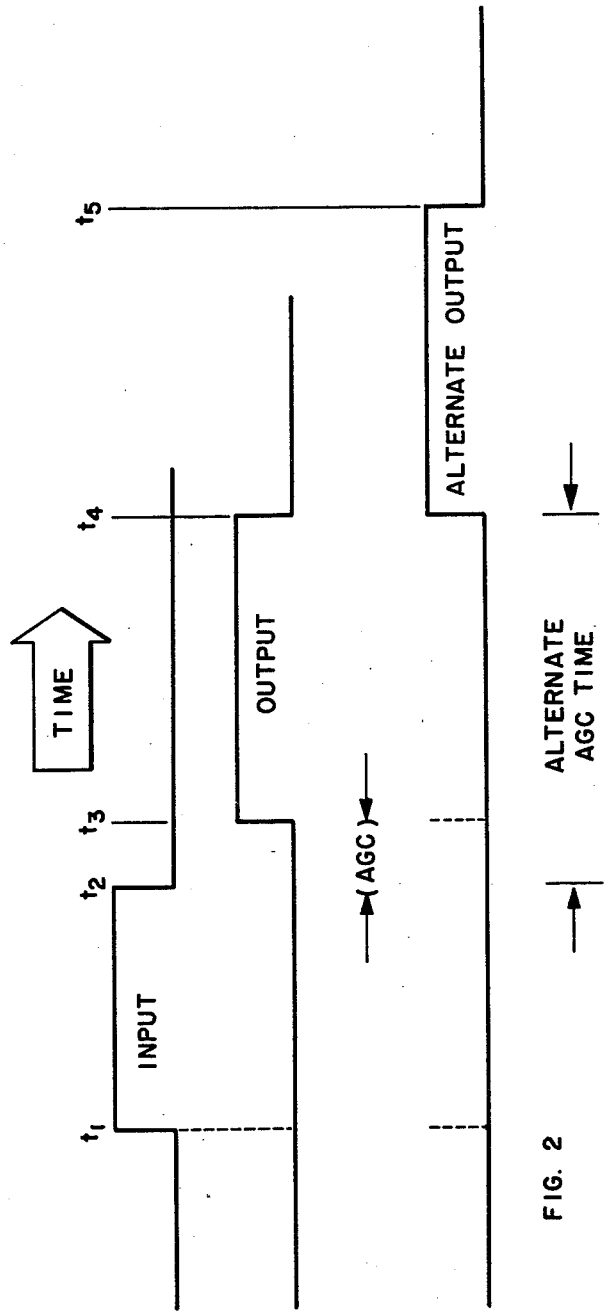
GERALD M. WEBSTER INVENTOR.
BY John D. Gassett
ATTORNEY

United States Patent Office 3,176,305
Patented Mar. 30, 1965

3,176,305
SEISMIC SIGNAL PROCESSING SYSTEM
Gerald M. Webster, Tulsa, Okla., assignor to Jersey Production Research Company, a corporation of Delaware
Filed Feb. 1, 1962, Ser. No. 170,462
12 Claims. (Cl. 346—33)

This invention generally relates to a system for processing transient signals in such a way that their phase spectrum is preserved (or shifted a preassigned amount not dependent on the input signal) while the amplitude spectrum is given a preassigned shape. This invention particularly relates to improvements in the art of geophysical exploration. It is especially concerned with a new system for processing a seismic signal.

A method commonly employed in searching for petroleum or other mineral deposits is that known as seismic prospecting wherein a seismic disturbance is initiated at a selected point at or near the earth's surface to direct seismic waves downwardly into the earth from that point. The waves continue to travel downwardly within the earth until they encounter discontinuities in the earth's structure in the form of various subsurface formations and the like. These discontinuities have the effect of reflecting at least a portion of the seismic wave back toward the surface of the earth. Sensitive pickups called seismic detectors or geophones are arranged at the detection points to translate the detected motion into electrical energy which after suitable amplification is recorded. The signal recorded is indicative of the character of the ground motion and is usually referred to collectively as a seismic signal which is in effect a composite signal made up of a plurality of electrical signals varying in frequency and amplitude.

The seismic signal thus detected and recorded is then processed and displayed in various ways. A commonly used processing system for removing unwanted frequency components includes a plurality of band pass filters in parallel and the seismic signal to be processed is connected to each filter. Each filter is selected to permit the passage of certain frequencies with essentially no alteration in their amplitude. The outputs of the filters are then combined in a composite signal in which the undesired frequency components have been eliminated. The recombined signal is then amplified as desired and recorded or otherwise displayed. The various frequency components of the recombined signal are time-wise and amplitude-wise the same as in the original signal with, of course, the unwanted frequencies filtered out. This system is quite useful in getting rid of various noises, etc. at the expense of some useful information.

The down-travelling seismic pulse is in effect a composite signal having different frequency components. As the seismic pulse or wavelet passes through the earth, the various frequency components thereof are attenuated differently by the travel of the wavelet through the earth. This results in the value of some of the desired frequency components being reduced to the extent that they do not properly influence the characteristics of the final recorded seismic signal.

A seismic signal is made up of a great many pulses which are the result of a single down-travelling pulse or wavelet which has been reflected back to the surface by many reflecting interfaces. The composition of a record therefore is influenced by the shape of the down-travelling pulse and the spacing of the reflectors or the subsurface formations. Some seismic signals differ in appearance then because the bed spacing or reflection coefficient differs; but some seismic records or signals taken in the same area are different because the shape of the down-travelling pulse varies from one location of a seismic disturbance to another. One object of this invention is to eliminate or reduce the variation between seismic signals which results from the differences in down-travelling wavelets.

A rather common practice in initiating a seismic shock wave is a detonation of an explosive charge at or near the surface of the earth. The frequency spectrum for such an explosion may take the shape, for example, of that shown in FIG. 3. Higher frequencies not shown are present and are not illustrated inasmuch as they are commonly rapidly absorbed by the earth. A particularly desirable frequency spectrum is illustrated in FIG. 4. Also in seismic operations the elastic properties of the medium surrounding the explosive often vary with location. In addition, the size and depth of the shot vary. These variations often cause changes in the frequency content of seismic records and make interpretation more difficult. The system disclosed herein can be described as a special purpose seismic filter for reducing the effects of shot parameters.

In accordance with the present invention, in a preferred embodiment a composite seismic signal is fed to a "comb" filter having a plurality of narrow band pass filter sections in parallel. The filter sections are characterized by being sharply tuned, that is having a high Q. In a resonant circuit the term Q is a measure of the ratio of resonant frequency to the width of the band of frequencies which are passed with greater than 50% of the original power. The filter sections are spaced equally and preferably at about one cycle intervals over the part of the frequency spectrum which is of interest. As will be shown later, the spacing between filter sections is determined by the length of the signal to be processed. The output of each filter section is fed to an automatic gain control (AGC) unit which serves to amplify, or limit a desired amount, the frequency component of the signal with which that filter section is associated. After each frequency component has been passed through its individual amplifier having a selected automatic gain control, the frequency components are added, thus forming a composite seismic signal. However, the output from the adding means is not used until after all of the seismic signal to be processed has been fed to the individual filter sections. This permits each frequency component of the entire seismic signal to influence the output of its filter section before the output of the adding means is recorded.

After the entire signal has been fed to the comb filter, the outputs of the filter sections are sine waves of essentially unvarying amplitude and phase. These sine waves are the components of the seismic signal which would be given by a Fourier analysis. Each frequency component is then acted upon by its AGC unit to give that component its preassigned weight. The recombined seismic signal then is a composite normalized signal in which each of the various frequency components in the selected spectrum have been given a selected weight or value.

Other objects and a better understanding of the invention may be readily understood from the following description taken in conjunction with the drawing in which:

FIG. 1 is a block diagram showing the component parts of a preferred embodiment;
FIG. 2 illustrates the time sequence of events of the feeding of the seismic signal to the "comb" filter, AGC action, and output recording;
FIG. 3 illustrates a frequency spectrum of a typical down-travelling pulse; and,
FIG. 4 illustrates a frequency spectrum of a seismic signal processed in accordance with this invention in which all frequency components have been given equal weight.

Reference numeral 10 represents a seismic signal source. This signal source may include a seismic signal amplified and coming directly from a geophone or geophone location; however, it will normally be a reproduced signal which has been recorded in reproducible form such as on magnetic tape. The source illustrated in FIG. 1 includes a magnetic tape 12 upon which the seismic signal has been recorded and a reproducing drum 14 and its associated reproducing head 16. The output from reproducing head 16 is fed to a gate 18. Gate 18 is controlled by switch 20. When switch 20 is closed, gate 18 is operative to pass the output from head 16 to comb filter 22. Switch 20, which can be a microswitch, is mounted adjacent the end of drum 14. Drum 14 has a cam 24 or other means which actuates switch 20. The length of cam 24 is determined by the duration T, the time of the seismic signal, or its fraction, which is being processed. When the signal to be processed has been completely reproduced, switch 20 is opened which operates to prevent gate 18 from passing a signal. In other words, gate 18 passes a signal to comb filter 22 only during the time T. These time sequences will be discussed more fully hereinafter in relation to FIG. 2.

Attention will now be directed to comb filter 22 which is comprised of a plurality of parallel filter sections 26A to 26n. Each filter section is highly tuned, i.e. each filter section is a high Q filter. The filter sections are essentially equally spaced, or more specifically are integral multiples of a fundamental frequency $f_0$. If the highest frequency is expressed by $Nf_0$, the next to the highest filter section should have a response frequency indicated by $(N-1)f_0$. If the lowest frequency is expressed by $Mf_0$, the next to the lowest filter section should have a response frequency indicated by $(M+1)f_0$, etc. If $f_0$ were chosen to be 1 c.p.s. for example, and the frequency range of interest was 20 to 50 c.p.s.; the filter sections could have center frequencies of 20, 21, 22 . . . 50. It is desirable to include all these frequencies and if this is done, the spacing between filter sections will be $f_0$. An especially suitable filter section is a tuning fork type filter. Such a filter is described in an article by Karl Walfsberg published in the Journal of the Acoustical Society, volume 22, 1950, beginning on page 847. Comb filter 22 in a sense automatically makes a Fourier analysis of the seismic signal over the frequency range of interest. Comb filter 22 has a frequency response which is a series of spikes at a set of equally spaced frequencies. The impulsive response of such a filter is a comb time function, that is, a repetitive series of impulses at times equal to the reciprocal of the spacing, $f_0$, of the frequencies of the filter sections. In considering the output of each individual filter section 26A of the comb 22, it has ideally an impulsive response of cos $mw_0t$ where $w_0=2\pi f_0$, and where $m$ is between the limits M and N. The impulsive response of an actual tuned filter is however $$e^{-\frac{wt}{2Q}} \sin wt$$

Because of the phase difference in the ideal and actual response, the output of each filter 26A to 26n is fed to a delay circuit 28A to 28n respectively. The delay circuits are selected to compensate for the delay of the various frequencies through their respective filter sections so that the phase of the output of each filter with respect to the output of the other filter is the same as the phase of the input to the filters; that is, the delay is chosen to achieve zero phase shift.

The filter sections are further selected to have high enough Q for essentially equal amplitude during the time $$\frac{1}{f_0}$$

However, minor decay up to about 10% over this period is tolerable. Now consider the response of an individual filter section to an input $f(t)$ which is zero before time 0 and after some time T, this time T being less than the repeat time of the comb filter 22. During the time $0<t<T$, the output of the filter section has an amplitude and phase which are changing; when $t>T$, the output has constant amplitude and phase. This constant amplitude and phase are equal to the respective Fourier series compotent of $f(t)$.

The output of each delay circuit 28A to 28n is fed through an automatic gain control unit (AGC) 30A to 30n. The AGC units 30A to 30n are of a character to set the output of each filter at the desired amplitude.

The outputs from each AGC unit 30A to 30n are added together through known means to a common junction 32. Junction 32 is connected through gate 34 to recording means 36. A second microswitch 38 is supported adjacent drum 14. A cam 40 is mounted on the end of drum 14. As drum 14 is rotated, cam 40 comes in contact with switch 38 and operates to close the switch. By suitable positioning of cam 40, then it is seen that the gate 34 can be actuated at any desired or selected period to permit the recombined signal from junction 32 to pass to recorder 36.

A brief discussion of the operation of the device of FIG. 1 will now be given. Let it be assumed that the portion of interest of input signal is for a duration time T, which is illustrated in FIG. 2 as the time between $t_1$ and $t_2$. A number of filter sections 26A to 26n are selected to cover the range of interest which, for example, can be 40 to 79 cycles per second frequencies. Typically, the filters can be spaced one cycle per second apart. The repetition time of the comb filter 22 then is $$\frac{1}{f_0} \text{ or } \frac{1}{1 \text{ cycle per second}}$$

which is one second. If it is desired to process a longer input signal, closer spacing of the filters can be made. However, the seismic signal can be reproduced at a greater rate when a lower band of frequencies are of interest so that a longer input signal can be processed.

Cam 24 on drum 14 is selected and arranged in relation to tape 12 so that switch 20 is actuated during the time $t_1$ to $t_2$ (FIG. 2). While switch 20 is actuated, gate 18 permits the input seismic signal to pass to comb filter 22. It is desired that $t_1$ to $t_2$, the time T of the input signal, be slightly less than $$\frac{1}{f_0}$$

in order to permit AGC units 30A to 30n to reach equilibrium on the final output sinusoidal signal from each filter section 26A to 26n respectively during time $t_2$ to $t_3$.

AGC units 30A to 30n are adjusted so that each frequency sinsoidal waveform is adjusted to the desired or selected amplitude. The output of each AGC unit is fed through suitable adding means to a common junction 32 which is connected through gate 34 to recording means 36. Since the frequencies are integral multiples of a fundamental, the sum of the AGC filtered outputs will be a repetitive function. Gate 34 is operative to open from the time, as shown in FIG. 2, of $t_3$ to $t_4$, which is the same length of time as from $t_1$ to $t_3$. $t_3$ preferably begins at a time after $t_2$ sufficiently great to permit the AGC to have time to operate upon the sinusoidal wave of each frequency. Another way of expressing $t_3$ is $$t_1 + \frac{1}{f_0}$$

as at this point the signal from the filter 22 begins the repeat of itself. The duration of the output of time is equal to $$\frac{1}{f_0}$$

therefore, $t_4$ is also expressed as $$t_1 + \frac{2}{f_0}$$

$t_5$ is also expressed as $$t_1 + \frac{3}{f_0}$$

If it is desired that each frequency have the same weight, such as illustrated in the frequency spectrum of FIG. 4, then AGC units 30A to 30n are set at the same level. The AGC unit can be a fast-acting unit, such as a clipper circuit followed by a low pass filter which in a sense is instantaneous AGC. However, if desired, AGC can be slow-acting and an alternate output can be obtained during a later repeat of the composite signal of the filter. This is illustrated in time in FIG. 2 as beginning at $t_4$ which is the end of the first output. The end of the alternate output signal is illustrated as time $t_5$. Gate 34 is actuated during output between $t_3$ to $t_4$ or between $t_4$ and $t_5$ by proper arrangement of cam 40 in relation to switch 38 so that switch 38 is closed during the selected time. When switch 38 is closed, gate 34 permits the signal from junction 32 to be recorded on recording means 36. The output signal is not recorded during the time of the input signal but rather is recorded in the second (or third as an alternate) period. At this time the output of each component of the comb filter 26A is essentially a sinusoidal wave whose amplitude is at a preassigned level to which its AGC unit is set and whose phase is that of the Fourier series component of the input. Since the input is a transient of duration T, this system can be called a transient system. It is also to be noted that the output waveform of the system keeps on repeating with the period $$\frac{1}{f_0}$$

until the sinusoidal waveform decays below a useable level. The output from gate 34 then is seen to be a composite seismic signal which has its frequency spectrum adjusted in a preselected manner. For example, the frequency spectrum of the recombined processed signal may be similar in appearance to the frequency spectrum of the seismic down-travelling pulse. This adjusting process may be repeated for any number of signals which are desired to make up a seismic section.

It will be apparent to persons skilled in the art that many modifications of this invention are possible without departing from its spirit or scope. It is intended that the invention not be limited to the specific examples presented and it is therefore desired that only such limitations be imposed on the appended claims as are stated therein.

What is claimed is:

1. A system for processing a transient signal which comprises in combination: a comb filter having a plurality of essentially equally-spaced filter sections in parallel, said comb filter including an AGC unit for each said filter section, said comb filter being further characterized such that its impulsive response is a repetitive function; adding means to add the output of each AGC unit of the comb filter; controlled recording means connected to the said adding means to record the output from said adding means during a repetitive period of the comb filter beginning after it has received the complete input signal.

2. An apparatus for processing a selected portion of a seismic signal, such portion having a duration of time T which portion is reproducible by a reproducing means which comprises in combination: a comb filter electrically connected to said reproducing means, said comb filter comprising a plurality of parallel sharply-tuned tuning fork filters having a high Q, each tuning fork filter being tuned for a different frequency, said frequencies being essentially equally spaced over the desired range; time delay means for each said tuning fork filter such that the time delay of the frequency component passing through each such tuning fork filter is constant; a plurality of automatic gain control units connected to the output of each said time delay means; adding means to add the outputs from each said automatic gain control unit; recording means; indicating means to indicate a selected point in time after the selected portion of the seismic signal has been reproduced; and gate control means responsive to said indicating means and connected between said adding means and said recording means and operable to open for a selected period of time which period begins at a selected time after the total selected portion of the seismic signal has been fed to said comb filter.

3. An apparatus for processing a seismic signal which is stored in reproducible form which comprises in combination: reproducing means to reproduce said seismic signal; a plurality of parallel sharply-tuned narrow-band pass filter sections connected to said reproducing means, each said filter section having a high Q and being tuned for a different frequency, the frequencies being equally spaced over a selected range; time delay means for each said filter section such that the time delay of the frequency component passed through each said filter section is constant; a plurality of automatic gain control units, a unit being connected to the output of each said filter sections; adding means to add the output from each said automatic gain control unit; recording means; a circuit connecting said recording means with the output of said adding means; detecting means responsive to said reproducing means to give an indication when a selected portion of said seismic signal is being reproduced; first gate control means responsive to said detecting means to pass the selected portion of the seismic signal to the plurality of sharply-tuned narrow-band pass filter sections; second gate control means in said circuit to permit the signal from said adding means to be recorded during a selected period of time beginning a selected time after the selected portion of the seismic signal has been reproduced.

4. An apparatus as defined in claim 3 in which said filter sections are tuning forks.

5. A system for processing a transient signal which includes: a comb filter connected to said signal, the elements of said comb filter having a response to said signal which comprises a plurality of sinusoidal waveforms spaced essentially even over the frequency band of interest of said signal, each sinusoidal waveform being substantially equal to a Fourier series component of the transient signal; an AGC unit connected to said filter for each said sinusoidal waveform; adding means to add the outputs of the AGC units; controlled recording means to record the output of said adding means during a repetitive period of the response of the comb filter beginning after it has received the complete transient signal.

6. An apparatus for processing a selected portion of a seismic signal which is stored in reproducible form which comprises in combination: means to reproduce said seismic signal; a comb filter including a plurality of parallel sharply-tuned narrow band pass filter sections with each filter section being tuned for a different frequency, said comb filter being further characterized in that its impulsive response is a repetitive function, first gate control means to pass only the selected portion of the seismic signal to said comb filter; time delay means for each said filter section such that the time delay of the frequency component passed through each said filter section is constant; a plurality of automatic gain control units, a unit being connected to the output of each said filter section; adding means to add the outputs from said automatic gain control units; recording means connected to said adding means; and second gate control means operable to pass a signal from said adding means to said recording means during a repetitive period of said comb filter which period begins at a selected time after the total selected portion of the seismic signal has been fed to said filter sections.

7. An apparatus as defined in claim 6 in which each filter section is a tuning fork filter.

8. An apparatus as defined in claim 6 in which each automatic gain control unit is a clipping circuit and a low-pass filter.

9. An apparatus for processing a selected portion of a seismic signal, such portion having a duration of time T which portion is reproducible by a reproducing means; which comprises in combination:

a comb filter electrically connected to said reproducing means, said comb filter comprising a plurality of sharply tuned tuning fork filters connected in parallel and having a high Q, each tuning fork filter being tuned to a different frequency, said frequencies being essentially equally spaced over the desired range;

time delay means for each said tuning fork filter such that the time delay of the frequency component passing through each such tuning fork filter is constant;

a plurality of automatic gain control units, one such unit connected to the output of each said time delay means;

adding means to add the outputs from said automatic gain control units;

indicating means to indicate a selected point in time after the selected portion of the seismic signal has been reproduced;

and gate control means responsive to said indicating means and connected to the output of said adding means.

10. A system for processing a transient signal which comprises in combination:

a comb filter having a plurality of equally spaced filter sections connected in parallel, said comb filter including an automatic gain control unit for each said filter section, said comb filter being further characterized such that its impulsive response is a repetitive function;

adding means to add the outputs of said automatic gain control units of the comb filter.

11. An apparatus for processing a seismic signal which is stored in reproducible form which comprises in combination:

reproducing means to reproduce said seismic signal;

a plurality of parallel sharply-tuned narrow bandpass filter sections connected to said reproducing means, each said filter section having a high Q and being tuned for a different frequency, the frequencies being equally spaced over a selected range;

time delay means for each said filter section such that the time delay of the frequency component passed through each said filter section is constant;

a plurality of automatic gain control units, a unit being connected to the output of each said filter section;

adding means to add the outputs from said automatic gain control units;

detecting means responsive to said reproducing means to give an indication when a selected portion of said seismic signal is being reproduced;

first gate control means responsive to said detecting means to pass a selected portion of the seismic signal to the plurality of sharply-tuned narrow bandpass filter sections; and second gate control means connected to the output of said adding means to pass a signal during a period of time beginning at a time after the selected portion of the seismic signal has been reproduced.

12. An apparatus as defined in claim 11 in which said filter sections are tuning forks.

References Cited by the Examiner

UNITED STATES PATENTS

| | | | |
|---|---|---|---|
| 2,666,196 | 1/54 | Kinsley et al. | 340—171 |
| 2,705,795 | 4/55 | Fisk et al. | 328—104 X |
| 2,716,733 | 8/55 | Roark | 330—126 X |
| 2,951,738 | 9/60 | Maneval | 346—33 |
| 2,975,399 | 3/61 | Burns | 340—15.5 |
| 2,986,722 | 5/61 | Williams | 346—33 |
| 3,071,652 | 1/63 | Schroeder | 179—15.55 |
| 3,079,464 | 2/63 | Baumel | 179—15.55 |

LEO SMILOW, *Primary Examiner.*